(12) United States Patent
Tanizaki (10) Patent No.: US 11,274,756 B2
(45) Date of Patent: Mar. 15, 2022

(54) VALVE

(71) Applicant: ADVICS CO., LTD., Kariya (JP)

(72) Inventor: Kazuki Tanizaki, Aichi-ken (JP)

(73) Assignee: ADVICS CO., LTD., Kariya (JP)

( * ) Notice: Subject to any disclaimer, the term of this patent is extended or adjusted under 35 U.S.C. 154(b) by 0 days.

(21) Appl. No.: 17/050,662

(22) PCT Filed: May 24, 2019

(86) PCT No.: PCT/JP2019/020649
§ 371 (c)(1),
(2) Date: Oct. 26, 2020

(87) PCT Pub. No.: WO2019/225738
PCT Pub. Date: Nov. 28, 2019

(65) Prior Publication Data
US 2021/0239226 A1 Aug. 5, 2021

(30) Foreign Application Priority Data
May 25, 2018 (JP) .............................. JP2018-100954

(51) Int. Cl.
*F16K 15/04* (2006.01)
(52) U.S. Cl.
CPC .................................. *F16K 15/044* (2013.01)
(58) Field of Classification Search
CPC . F16K 15/044; F16K 17/0446; F16K 17/0406
See application file for complete search history.

(56) References Cited

U.S. PATENT DOCUMENTS

| 9,989,160 | B2 * | 6/2018 | Soeda | F16K 15/044 |
| 2003/0230930 | A1 | 12/2003 | Inage et al. | |
| 2011/0142703 | A1 | 6/2011 | Soeda | |
| 2014/0076429 | A1 * | 3/2014 | Masui | F16K 15/025 |
| | | | | 137/535 |
| 2017/0009900 | A1 * | 1/2017 | Kubo | F16K 17/0406 |

FOREIGN PATENT DOCUMENTS

| JP | H0458676 U | 5/1992 |
| JP | 2004019805 A | 1/2004 |
| JP | 2012082762 A | 4/2012 |
| JP | 2019-167897 A | 10/2019 |

OTHER PUBLICATIONS

International Search Report (PCT/ISA/210) dated Jun. 8, 2019, by the Patent Office as the International Searching Authority for International Application No. PCT/JP2019/020649.
Written Opinion (PCT/ISA/237) dated Jun. 8, 2019, by the Japanese Patent Office as the International Searching Authority for International Application No. PCT/JP2019/020649.

* cited by examiner

*Primary Examiner* — Kevin F Murphy
(74) *Attorney, Agent, or Firm* — Buchanan Ingersoll & Rooney PC (57) ABSTRACT

A valve of the present disclosure includes a valve seat formed with a valve hole; a spherical valve body; and a pressing member that presses the valve body toward the valve hole, the valve hole being closed by the valve body pressed by the pressing member; where the pressing member includes a guiding part that, when a force opposing the urging force acts on the valve body by greater than or equal to a prescribed value, separates the valve body away from the valve seat while guiding and relatively moving the valve body in a predetermined one direction.

10 Claims, 7 Drawing Sheets

VALVE

TECHNICAL FIELD

The present disclosure relates to a valve.

BACKGROUND ART

An example of the valve is a relief valve including a plunger, a valve body, a valve seat, and a spring. The relief valve is configured such that the spring presses the plunger and the valve body toward the valve seat, and the valve body closes the valve hole provided in the valve seat. When a pressure greater than or equal to a predetermined pressure is applied to the valve body through the valve hole, the valve body presses the plunger against the urging force, and the valve body moves thus opening the valve hole. When opening and closing the valve, the valve body vibrates due to the negative pressure generated when the fluid passes through the gap between the valve body and the valve seat, which causes abnormal noise. Here, Japanese Unexamined Patent Application Publication No. 2012-82762 discloses a relief valve configured such that a ball, or valve body, is pressed against a wide-width portion on one side in the radial direction of the seat surface. The vibration of the ball is thereby prevented.

SUMMARY OF INVENTION

Technical Problems

However, even in the relief valve described above, the ball can move in the region on the other side in the radial direction when the ball is separated from the wide-width portion. The ball can move, for example, in the backward direction or the forward direction in the plane of drawing in FIG. 3 of Japanese Unexamined Patent Application Publication No. 2012-82762. This may cause vibration when the valve is opened and closed, and there is room for improvement in terms of vibration prevention. Furthermore, in the relief valve described above, since the ball holding portion has a conical shape so as to grip the ball, it moves integrally with the ball in terms of the configuration. Therefore, the ball holding portion also vibrates together according to the vibration of the ball, which may increase the abnormal noise.

The present disclosure has been made in view of such circumstances, and an object thereof is to provide a valve capable of preventing vibration of a valve body.

Solutions to Problems

A valve of the present disclosure relates to a valve including a valve seat formed with a valve hole; a valve body; and a pressing member that presses the valve body toward the valve hole, the valve hole being closed by the valve body pressed by the pressing member; when a force opposing a pressing force of the pressing member acts on the valve body by greater than or equal to a prescribed value, where the pressing member includes a guiding part that separates the valve body away from the valve seat while relatively moving the valve body in a predetermined one direction.

According to the present disclosure, when the valve is opened, the valve body is guided by the guiding part in the predetermined one direction, and the valve body is prevented from moving in other directions. As the movement of the valve body is restricted to one direction, the position of the flow path formed between the valve body and the valve seat becomes a constant position. Thus, the valve body may be prevented from swinging in various directions, and the vibration of the valve body may be prevented. Furthermore, when the valve body moves, the valve body relatively moves with respect to the guiding part, so that the valve body and the pressing member may be prevented from moving integrally.

DESCRIPTION OF EMBODIMENT

Figure 1:
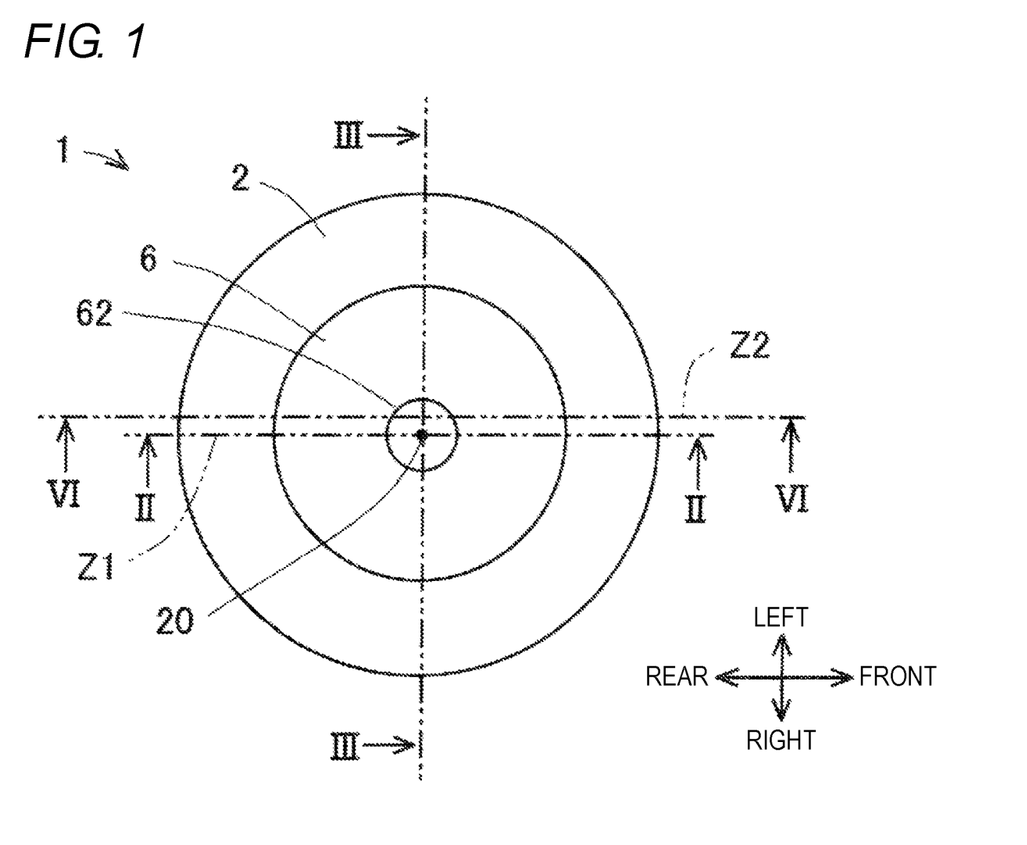
FIG. 1 is a schematic plan view of a valve of the present embodiment.
Figure 2:
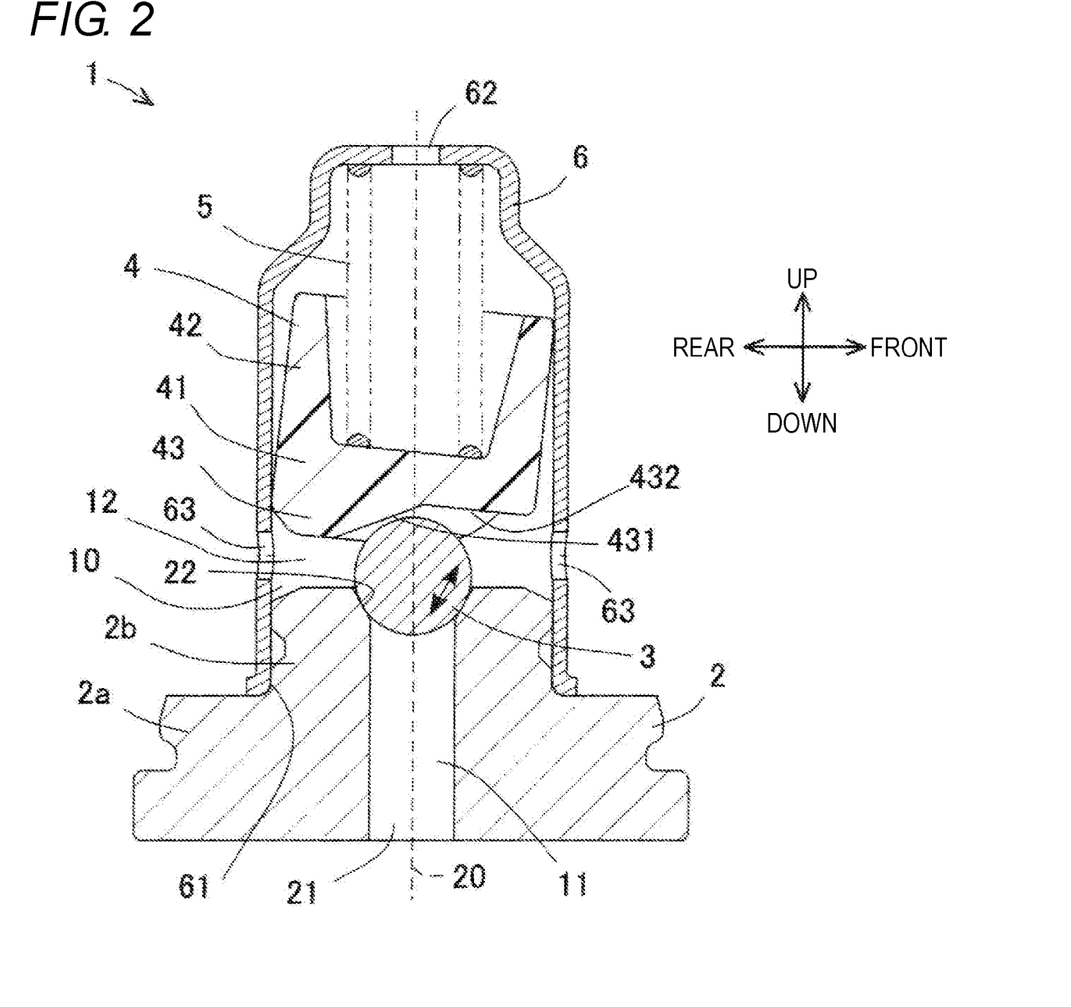
FIG. 2 is a cross-sectional view taken along line II-II of FIG. 1 (left-right cross-section).
Figure 3:
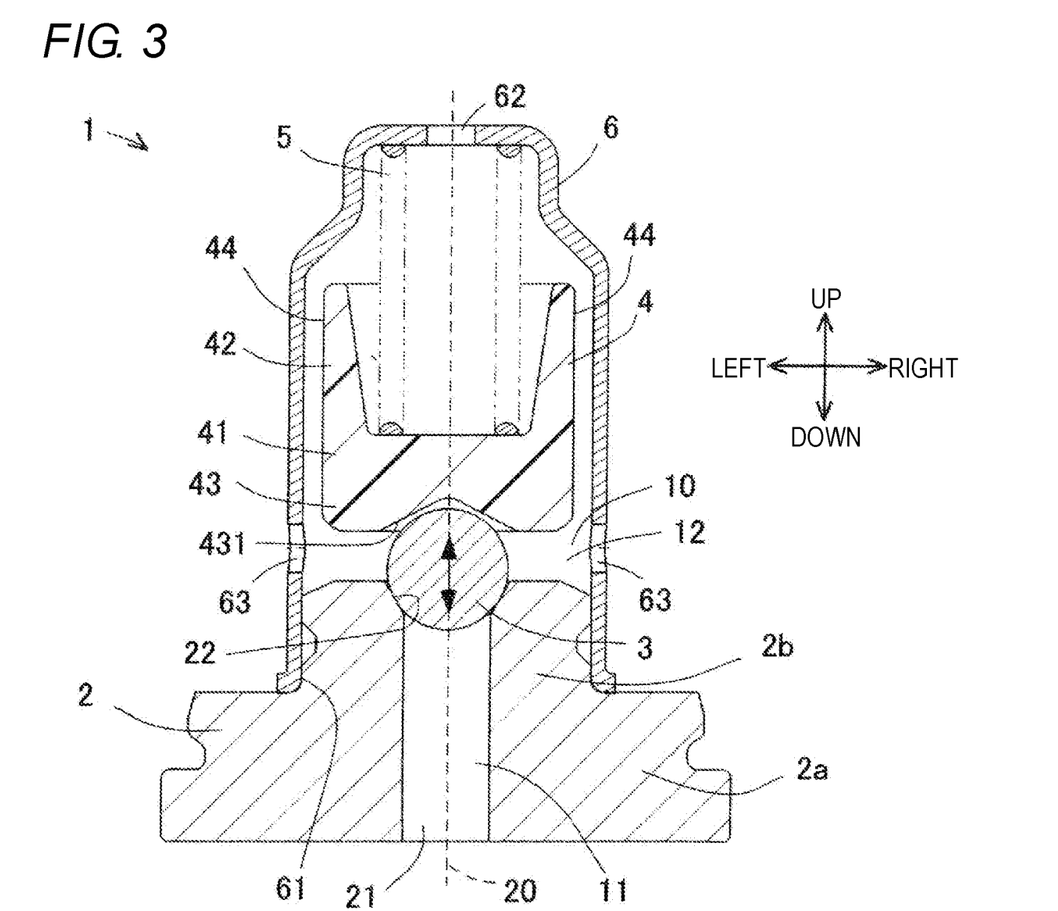
FIG. 3 is a cross-sectional view taken along line III-III of FIG. 1.
Figure 5:
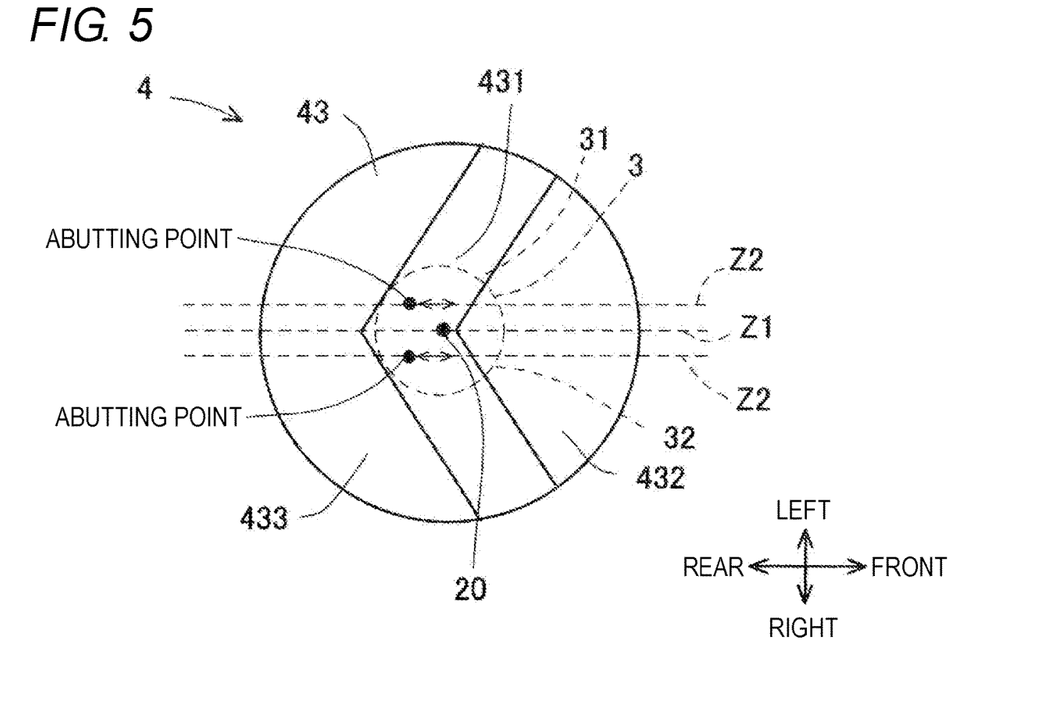
FIG. 5 is a schematic bottom view of the pressing member 4 of the present embodiment.

Hereinafter, an embodiment of the present disclosure will be described based on the drawings. The drawings are schematic diagrams, and in particular, FIGS. 1, 5, 6, 8, and 9 are conceptual diagrams in which the shapes are simplified. The valve 1 of the present embodiment is a valve having a function of a relief valve (i.e., relief valve). As illustrated in FIGS. 1 to 3, the valve 1 includes a valve seat 2 in which a valve hole 21 is formed, a spherical valve body 3, a pressing member 4, an urging member 5, and a retainer 6. Hereinafter, unless particularly stated, the "axial direction" is the direction in which the valve hole 21 extends, and the "radial direction" is the radial direction of the valve hole 21. In other words, in the present embodiment, the axial direction is the axial direction of the valve seat 2, and the radial direction is the radial direction of the valve seat 2. Hereinafter, for the sake of explanation, the right side, left side, upper side, and lower side in FIGS. 1 and 5 are referred to as front, rear, left, and right of the valve 1, respectively, and the right side, left side, upper side, and lower side in FIGS. 2 and 7 are referred to as front, rear, up, and down of the valve 1, respectively. In the description, the up-down direction corresponds to the axial direction, and for example, the lower side can be said to be axially one side and the upper side can be said to be axially other side.

The valve seat 2 is a cylindrical metal member, and a part of the valve seat 2 is press-fitted and fixed in the lower opening 61 of the retainer 6. The valve hole 21 extending in the up-down direction is formed in the center of the valve seat 2. The valve hole 21 is formed so that a cross-section (flow path cross-section) orthogonal to the axial direction has a circular shape, and forms a part of the flow path 10 of the valve 1. A valve seat surface 22 with which the valve body 3 abuts is formed at the periphery of the valve hole 21 at the upper end of the valve seat 2. The valve seat surface 22 is formed to a tapered shape (conical surface shape) whose diameter decreases as it approaches the valve hole 21. The valve seat 2 includes a lower part 2a having a relatively large diameter and an upper part 2b having a relatively small diameter and arranged in the retainer 6.

The valve body 3 is a metal ball valve, and is arranged on the lower side of the valve seat 2. The diameter of the valve body 3 is larger than the diameter of the valve hole 21. The valve body 3 is located between the valve seat 2 and the pressing member 4. In a state where the valve body 3 is abutted over the entire circumference of the valve seat surface 22, the valve body 3 closes the valve hole 21 and the valve 1 is closed. Hereinafter, a state where the valve body 3 is abutted over the entire circumference of the valve seat surface 22 is also referred to as a closed state.

The pressing member 4 is a so-called plunger, and is a resin member that is located between the valve body 3 and the urging member 5 and presses the valve body 3 toward the valve hole 21 by the urging force of the urging member 5. The valve 1 is configured such that the valve body 3 pressed by the pressing member 4 closes the valve hole 21. Details of the pressing member 4 will be described later.

The urging member 5 is a coil spring whose lower end is abutted to the pressing member 4 and upper end is abutted to the retainer 6. The urging member 5 is arranged between the pressing member 4 and the retainer 6 in a compressed state. The urging member 5 presses the valve body 3 toward the valve seat 2 through the pressing member 4.

The retainer 6 is a cylindrical metal member having an opening 61 of a relatively large diameter on the lower side and an opening 62 of a relatively small diameter on the upper side. The retainer 6 is arranged coaxially with the valve seat 2. A plurality of openings 63 are formed on the side surface of the retainer 6 at equal intervals in the circumferential direction. The opening 63 is located between the valve seat 2 and the pressing member 4 in the closed state in the axial direction. The upper part of the retainer 6 is formed in a cylindrical shape having a smaller diameter than the lower part. The upper end of the urging member 5 is abutted to the periphery of the opening 62 in the retainer 6.

Here, the pressing member 4 will be described in detail. The pressing member 4 is a bottomed cylindrical member having a bottom surface on the lower side and an opening on the upper side. Specifically, the pressing member 4 includes a columnar portion 41 having a columnar shape, a cylindrical portion 42 having a cylindrical shape projecting toward the upper side from the outer peripheral edge of the upper surface of the columnar portion 41, and a guiding part 43 formed at the lower end of the columnar portion 41. The urging member 5 is arranged on the inner side of the cylindrical portion 42 and is abutted with the upper surface of the columnar portion 41.

The guiding part 43 is a portion of the pressing member 4 that abuts against the valve body 3. That is, the guiding part 43 is a portion that presses the valve body 3 toward the valve seat surface 22 side. The guiding part 43 is configured to guide the valve body 3 in a predetermined one direction and move the valve body 3 relatively away from the valve seat 2 when a force against the urging force of the urging member 5 acts on the valve body 3 by greater than or equal to a prescribed value. The guiding part 43 relatively moves the valve body 3 with respect to itself (guiding part 43).

Here, in the flow path 10 of the valve 1 partitioned into the valve body 3 in the closed state, a region on the lower side of the valve body 3 is a first region 11, and a region on the upper side of the valve body 3 is a second region 12. The force that opposes the urging force of the urging member 5 means a force of pressing the valve body 3 toward the upper side generated according to the difference between the pressure in the first region 11 and the pressure in the second region 12 (hereinafter, simply referred to as "differential pressure"). Furthermore, as illustrated in FIG. 2, a cross-section obtained by cutting the valve 1 along a plane orthogonal to a straight line extending in the left-right direction (hereinafter referred to as "left-right orthogonal plane") is referred to as a left-right cross-section. FIGS. 2 and 7 are left-right cross-sections when the valve 1 is cut along a plane including the central axis 20 of the valve seat 2.

The guiding part 43 has a guiding surface 431 which has two abutting points each of which contacts the valve body 3. The guiding surface 431 presses the valve body 3 toward the valve hole 21. The guiding surface 431 of the present embodiment is an inclined surface that is inclined so that it is located on the upper side as it goes forward. The guiding surface 431 appears as a straight line extending toward the front and the upper side (see the arrow in FIG. 2) in the left-right cross-section. As will be described later, the guiding surface 431 can be said to be formed by two inclined surfaces arranged in a V shape.

As illustrated in FIG. 3, at the cross-section of the valve 1 cut along a plane that is orthogonal to a straight line extending in the front-rear direction and includes the central axis 20, the guiding surface 431 has a concave shape (here, V-shaped) in which the opening width increases toward the lower side. The guiding surface 431 and the valve body 3 are abutted at both left and right sides of the center of the valve body 3. Thus, a force from both the left and right sides of the valve body 3 toward the center side of the valve body is generated with respect to the valve body 3, and the left-right movement of the valve body 3 is restricted.

Figure 4:
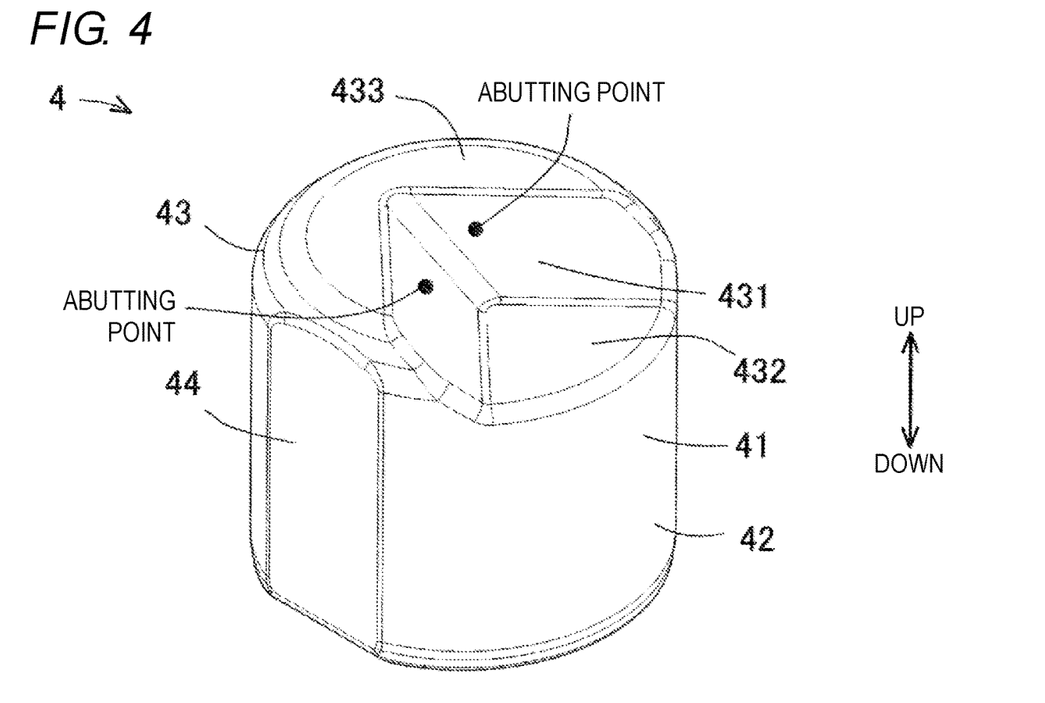
FIG. 4 is a perspective view of a pressing member 4 of the present embodiment.

As illustrated in FIGS. 4 and 5, the guiding part 43 is configured such that the lower end of the guiding surface 431 is located further on the front side as the position of the left-right orthogonal plane becomes farther from the central axis 20 of the valve seat 2. The position of the lower end of the guiding surface 431 is the rearmost in the left-right cross-section taken along a left-right orthogonal plane (hereinafter referred to as "virtual first plane") Z1 that includes the central axis 20 of the valve seat 2. In the present embodiment, the lower end and the upper end of the guiding surface 431 are V-shaped in which the left-right width increases toward the front when the guiding part 43 is viewed from the valve seat 2 (see FIG. 5). The valve body 3 is arranged so as to be sandwiched by two inclined surfaces in a V-shaped groove formed by the guiding part 43.

Further explaining, as illustrated in FIG. 4, the guiding part 43 has a first surface 432, a second surface 433 located on the lower side of the first surface 432, and a guiding surface 431 that connects the first surface 432 and the second surface 433. Since the first surface 432 and the second surface 433 are at different positions in the axial direction, the guiding part 43 is formed to a shape having a step difference. As illustrated in FIG. 5, when viewed from the lower side to the upper side, the fan-shaped first surface 432 and second surface 433 are separated in the front-rear direction. The guiding surface 431 inclined with respect to the axial direction connects the first surface 432 and the second surface 433. It can be said that the first surface 432 forms the bottom surface of the recess (groove) formed by the guiding part 43, and the guiding surface 431 forms the side surface of the recess.

As illustrated in FIG. 5, the guiding part 43 and the valve body 3 abut with each other at two points on the guiding surface 431. One abutting point is located at one side part 31 of the valve body 3 divided by the virtual first plane Z1, and the other abutting point is located at the other side part 32 of the valve body 3 divided by the virtual first plane Z1. That is, one abutting point is on the guiding surface 431 (one inclined surface) on the left side of the center, and the other abutting point is on the guiding surface 431 (other inclined surface) on the right side of the center. Both abutting points are symmetrical (left-right symmetrical) positions with respect to the virtual first plane. The two abutting points are located so as to sandwich the part of the valve body 3 on the pressing member 4 side (upper side). The two abutting points restrict the movement of the valve body 3 to the left and right, and apply a downward force to the valve body 3. The locus of the abutting point due to the movement of the valve body 3 is a straight line parallel to the virtual first plane Z1. The valve body 3 is guided by the guiding part 43 and slides or rolls with respect to the guiding part 43 and the valve seat 2. The locus along which the valve body 3 is guided by the guiding part 43 is located on the virtual first plane Z1. Note that, hereinafter, the locus when the valve body 3 is guided by the guiding part 43 is referred to as "valve body movement locus".

The valve body movement locus is the locus of the center of the valve body 3. The virtual first plane Z1 passes through the central axis 20. Therefore, the pressing member 4 is configured such that the valve body movement locus passes through the central axis 20. It can be said that the valve body movement locus passes through the central axis 20 or intersects with the central axis 20. When the valve body movement locus passes through the central axis 20, this means that the center of the valve body 3 is located on the central axis 20. More specifically, the valve body movement locus is located on the central axis 20 in the closed state and extends from the relevant position in a predetermined one direction. That is, it can be said that the valve body movement locus extends from a point on the central axis 20 in a predetermined one direction.

It can also be said that the two abutting points are located so as to sandwich the valve body movement locus. In the present example, the two abutting points are located in plane symmetry with respect to the plane including the valve body movement locus (virtual first plane Z1). The two abutting points are located in line symmetry with respect to the valve body movement locus when viewed from above (or below). As described above, the guiding part 43 includes the guiding surface 431 configured to abut with the valve body at at least two points, and so that the locus of the valve body 3 relating to the relative movement (valve body movement locus) passes through the central axis 20 of the valve hole 21. Furthermore, the two abutting points included in at least two points that abut against the valve body 3 on the guiding surface 431 are located in plane symmetry with respect to the plane (Z1) including the valve body movement locus.

According to the guiding part 43, when the valve body 3 receives an upward force by the differential pressure and moves, the valve body 3 is guided by the guiding surface 431 in a predetermined one direction (here, front and upper side). In other words, the movement of the valve body 3 from the closed state is restricted to one direction by the guiding part 43 (guiding surface 431). As illustrated in FIG. 5, the abutting point in the closed state is located at the rearmost position, and the abutting point moves forward as the valve body 3 separates away from the valve seat surface 22. As the valve body 3 is pressed toward the upper side, the valve body 3 is guided by the guiding surface 431 and moves toward the front and upper side (see the arrow in FIG. 2) along the valve seat surface 22. At this time, the pressing member 4 slightly moves toward the upper side while maintaining the abutment state with the valve body 3. On the contrary, when the differential pressure becomes small and the valve body 3 returns to the valve seat surface 22, the valve body 3 is guided by the guiding surface 431 and moves toward the rear and lower side along the valve seat surface 22, and the pressing member 4 also moves toward the lower side and returns to the initial position (position in the closed state).

Figure 6:
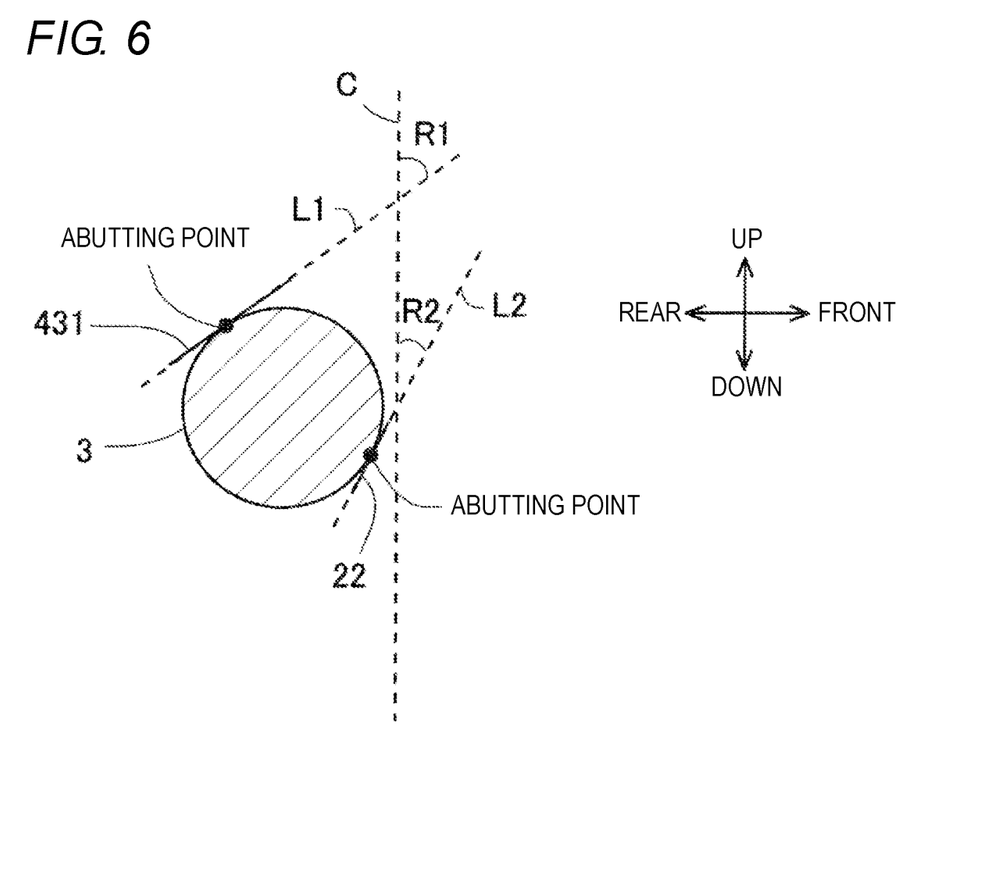
FIG. 6 is a schematic cross-sectional view taken along line VI-VI of FIG. 1 (abutment left-right cross-section).
Figure 7:
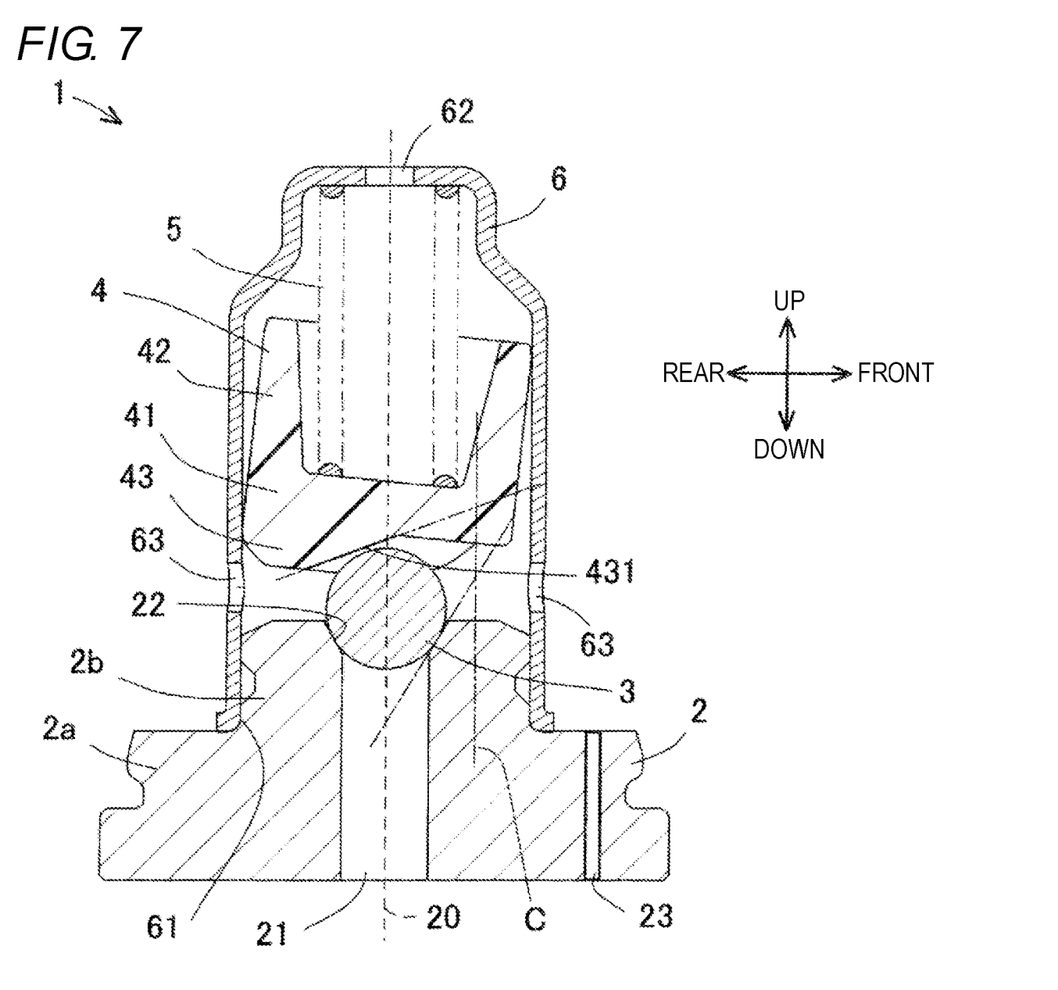
FIG. 7 is a cross-sectional view (left-right cross-section) taken along the line II-II of FIG. 1 illustrating an application example of the valve of the present embodiment to an actuator.

Here, as illustrated in FIGS. 5 and 6, at the left-right cross-section (hereinafter referred to as "abutment left-right cross-section") in which the valve 1 is cut along a left-right orthogonal plane (corresponds to "virtual second plane") Z2 including one of the abutting points of the two abutting points, a tangent line of the valve body 3 at the abutting point of the valve body 3 and the guiding surface 421 is a guiding straight line L1 and a tangent line of the valve body 3 at the abutting point of the valve body 3 and the valve seat surface 22 is a valve seat straight line L2. As illustrated in FIG. 2, the valve body 3 abuts against the entire circumference of the valve seat surface 22. The valve seat straight line L2 is a tangent line at the abutting point between the lower portion of the valve body 3 closer to the front side and the valve seat surface 22. That is, the guiding straight line L1 and the valve seat straight line L2 are respectively tangent lines at the abutting points located to sandwich the central axis 20, that is, the abutting point of the valve body 3 and the guiding surface 431 and the abutting point of the valve body 3 and the valve seat surface 22. In the present embodiment, the shapes of the guiding surface 431 and the valve seat surface 22 at the abutment left-right cross-section are linear shapes, and thus the guiding straight line L1 and the valve seat straight line L2 extend in a certain direction regardless of the position of the valve body 3. That is, in the abutment left-right cross-section, the guiding straight line L1 is a straight line parallel to the straight line that appears as the guiding surface 431, and the valve seat straight line L2 is a straight line parallel to the straight line that appears as the valve seat surface 22. The guiding surface 431 and the valve seat surface 22 are inclined at different angles with respect to the axial direction. Since the guiding surface 431 and the valve seat surface 22 have a linear cross-section, molding can be easily carried out.

At the abutment left-right cross-section, the guiding surface 431 and the valve seat surface 22 are formed such that an acute angle R1 formed by the straight line C parallel to the central axis 20 of the valve seat 2 and the guiding straight line L1 becomes greater than or equal to an acute angle R2 formed by the straight line C parallel to the central axis 20 and the valve seat straight line L2. In other words, in the abutment left-right cross-section, when the straight line C is the Y axis (vertical axis) and the straight line orthogonal to the straight line C is the X axis (horizontal axis), the inclination (absolute value) of the valve seat straight line L2 is greater than or equal to the inclination (absolute value) of the guiding straight line L1.

In the present embodiment, the angle R1 is larger than the angle R2 (R1>R2). That is, the separation distance between the guiding straight line L1 and the valve seat straight line L2 (e.g., the extension distance until the perpendicular line of one straight line intersects with the other straight line) increases toward the lower side. Thus, the pressing member 4 applies a pressing force in the direction of closing the valve hole 21 to the valve body 3 without using any other configurations, and when the valve open state shifts to the valve closed state, the valve body 3 more reliably abuts against the entire circumference of the valve seat surface 22. In the present embodiment, regardless of the position of the left-right orthogonal plane to be cut, in the left-right cross-section including the guiding surface 431 and the valve seat surface 22, the same relationship as described above, that is, the relationship in which the acute angle formed by the straight line representing the guiding surface 431 and the straight line C is greater than or equal to the acute angle formed by the straight line representing the valve seat surface 22 and the straight line C is established (see one dot chain line in FIG. 7) within the range in which the valve body 3 moves. In the present example, since the valve seat surface 22 has a tapered shape, the inclination of the tangent line at the contact point between the valve body 3 and the valve seat surface 22 is constant regardless of the position of the valve body 3. That is, the angle R2 is constant regardless of the position of the valve body 3. As described above, the pressing member 4 slightly moves toward the upper side with the movement of the valve body 3, but the angle R1 is constant. Therefore, the valve 1 of the present example is configured such that the angle R1>the angle R2 regardless of the position of the pressing member 4. In this case, the straight line connecting the abutting point between the guiding surface 431 and the valve body 3 and the abutting point between the valve seat surface 22 and the valve body 3 passes the upper side of the center of gravity of the valve body 3. Therefore, as the pressing member 4 presses the valve body 3, a force acts on the valve body 3 along the valve seat surface 22 in the direction of closing the valve hole 21. Thus, for example, when the upward force acting on the valve body 3 separated from the valve hole 21 is released, the valve body 3 can more reliably close the valve hole 21.

As described above, the valve seat 2 has the valve seat surface 22 against which the valve body 3 abuts, and the guiding part 43 and the valve seat surface 22 are formed so that a force of moving in a direction of closing the valve hole along the valve seat surface 22 acts on the valve body 3. Furthermore, the valve seat 2 has a tapered valve seat surface 22 that is linearly inclined with respect to the axial direction, which is the direction in which the valve hole 21 extends, and the guiding part 43 is provided with the guiding surface 431 that abuts against the valve body 3 and that is linearly inclined with respect to the axial direction.

Furthermore, as illustrated in FIG. 2, in the closed state, the pressing member 4 is inclined in the front-rear direction due to the abutment between the guiding surface 431 and the valve body 3, and the upper end on the front side and the lower end on the rear side of the pressing member 4 are abutted against the retainer 6. Thus, the pressing member 4 is stably arranged. The pressing member 4 is formed so that the above relationship (R1≥R2) is established in the closed state, that is, in the inclined state. The pressing member 4 presses the valve body 3 in a direction (front and lower side) offset from the central axis 20 through the guiding surface 431 (two abutting points). Thus, the valve body 3 is pressed toward the lower side by the pressing member 4 and also pressed toward the front portion of the valve seat surface 22. In other words, the direction of the force that the valve body 3 receives from the abutting point is the front and lower side, and the rearward movement of the valve body 3 is restricted in the closed state. Furthermore, notches are provided at the left and right ends of the pressing member 4 over the entire axial direction. Thus, the flow path width of the flow path that connects the valve hole 21 and the opening 62 can be increased.

According to the present embodiment, when the differential pressure (pressure in the first region 11>pressure in the second region 12) becomes greater than or equal to a predetermined pressure, a force greater than or equal to a prescribed value for pressing the valve body 3 toward the upper side is generated. In this case, since the movement toward the rear side and the movement toward the left and right are restricted by the guiding surface 431 of the guiding part 43, the valve body 3 moves in a predetermined one direction (front and upper side) along the valve seat surface 22 by the guidance of the guiding surface 431. That is, when the valve body 3 moves from the closed state due to the differential pressure, the valve body 3 slides on the guiding surface 431 while being in two-point contact with the guiding surface 431. As a result, the rear portion of the valve seat surface 22 and the valve body 3 are separated from each other, a flow path that communicates the first region 11 and the second region 12 is formed on the rear side of the valve body 3, and the valve 1 is opened. When the differential pressure becomes less than the predetermined pressure, the valve body 3 moves toward the rear and lower side (see the arrow in FIG. 2) on the valve seat surface 22 by the downward pressing force of the pressing member 4 and the inclination of the guiding surface 431 and the valve seat surface 22.

Thus, according to the present embodiment, when the valve 1 is opened, the valve body 3 is guided by the guiding part 43 in a predetermined one direction, and the valve body 3 is prevented from moving to the other direction. As the movement of the valve body 3 is restricted to one direction, the position of the flow path formed between the valve body 3 and the valve seat surface 22 becomes a constant position. Thus, the valve body 3 is prevented from swinging in various directions (e.g., circumferential direction of the valve seat 2, etc.), and the vibration of the valve body 3 is prevented. The valve 1 functions as a relief valve that opens when the differential pressure becomes greater than or equal to a predetermined pressure and closes when the differential pressure becomes lower than the predetermined pressure, and the vibration of the valve body 3 is prevented.

Furthermore, when the valve body 3 moves, the valve body 3 slides (relatively moves) with respect to the guiding surface 431, so the valve body 3 and the pressing member 4 do not move integrally. That is, according to the present embodiment, the valve body 3 and the pressing member 4 are prevented from vibrating integrally. Moreover, the valve seat 2 does not need to be formed in a shape in which the axis center of the valve seat surface 22 is offset from the center of the valve body 3, which is advantageous in terms of workability. The pressing member 4 does not require the strength of the valve seat 2 and can be formed relatively easily by resin molding as in the present embodiment.

Furthermore, the valve 1 may be arranged, for example, in an actuator of a vehicle braking device. Here, for example, as illustrated in FIG. 7, an orifice hole 23 having a smaller diameter than the valve hole 21 may be formed at a part of the valve seat 2 on the radially outer side of the retainer 6 (large-diameter part 2a). According to this configuration, it is possible to form a two-stage orifice in which the flow path through which the fluid flows changes depending on the magnitude of the differential pressure. For example, a piston pump is installed in the actuator, and a relatively large hydraulic pressure fluctuation occurs by the driving of the piston pump. Therefore, the transmission of the pulsation of the hydraulic pressure can be prevented while preventing the vibration of the valve body 3 by disposing the valve 1 (two-stage orifice). As described above, according to the present embodiment, the generation of abnormal noise can be prevented.

Collectively describing the configuration of the present embodiment, the valve 1 includes a valve seat 2 formed with a valve hole 21; a spherical valve body 3; and a pressing member 4 that presses the valve body 3 toward the valve hole 21, the valve hole 21 being closed by the valve body 3 pressed by the pressing member 4; where the pressing member 4 includes a guiding part 43 that, when a force opposing the urging force acts on the valve body 3 by greater than or equal to a prescribed value, separates the valve body 3 away from the valve seat 2 while guiding and relatively moving the valve body in a predetermined one direction.

Furthermore, the guiding part 43 includes a guiding surface 431 that has at least two abutting points with the valve body 3 and that presses the valve body 3 toward the valve hole 21, where when assuming a plane that includes the central axis 20 of the valve seat 2 and that is parallel to the predetermined one direction is the virtual first plane Z1, one of the two abutting points is located at the one side part 31 of the valve body 3 divided by the virtual first plane Z1 and the other of the two abutting points is located at the other side part 32 of the valve body 3 divided by the virtual first plane Z1. The two abutting points are located symmetrically with respect to the virtual first plane Z1. Furthermore, the valve seat 2 has a valve seat surface 22 on which the valve body 3 is seated, and assuming a plane that includes either one of the two abutting points and that is parallel to a predetermined one direction is a virtual second plane Z2, in a cross-section (abutment left-right cross-section) in which the guiding surface 431 and the valve seat surface 22 are cut along the virtual second plane Z2, a tangent line of the valve body 3 at an abutting point between the guiding surface 431 and the valve body 3 is assumed as the guiding straight line L1 and a tangent line of the valve body 3 at a point where the valve seat surface 22 and the valve body 3 are abutted to each other is assumed as a valve seat straight line L2, and the guiding surface 431 and the valve seat surface 22 are formed so that, in the abutment left-right cross-section, an acute angle R1 formed by the straight line C parallel to the central axis 20 of the valve seat 2 and the guiding straight line L1 becomes greater than or equal to an acute angle R2 formed by the straight line C parallel to the central axis 20 of the valve seat 2 and the valve seat straight line L2. Moreover, the guiding surface 431 and the valve seat surface 22 are formed in a straight line in the abutment left-right cross-section.

<Others>

Figure 8:
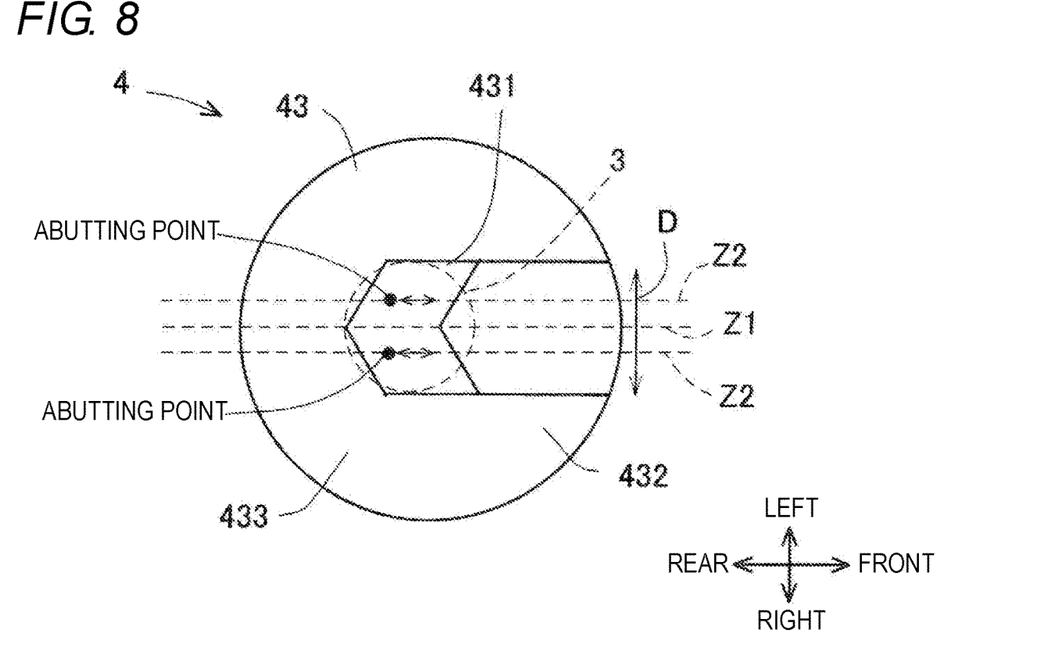
FIG. 8 is a diagram corresponding to FIG. 5 illustrating a modified example of the present embodiment.

The present disclosure is not limited to the embodiment described above. For example, the pressing member 4 may be made of metal. Furthermore, for example, as illustrated in FIG. 8, assuming a region between a left-right orthogonal plane including the left end of the valve body 3 in the closed state and a left-right orthogonal plane including the right end of the valve body 3 in the closed state is a valve body arrangement region D, the valve 1 may be formed so that the above relationship (R1≥R2) is established only in the valve body arrangement region D. From the viewpoint of easiness of arrangement, the valve 1 is preferably formed so that the above relationship (R1≥R2) is satisfied in a region including at least the valve body arrangement region D.

Furthermore, the cylindrical portion 42 of the pressing member 4 may be changed to a columnar part projecting out toward the upper side from the center of the upper end face of the columnar portion 41. In this case, the urging member 5 is arranged on the outer side of the columnar part. Moreover, the valve 1 may be, for example, an electromagnetic valve, in which case, the pressing member 4 has the position in the axial direction controlled according to the differential pressure, for example, by an ECU or the like while maintaining a state in which the valve body 3 and the pressing member 4 are abutted to each other and the valve body 3 and at least a part of the valve seat surface 22 are abutted to each other.

Figure 9:
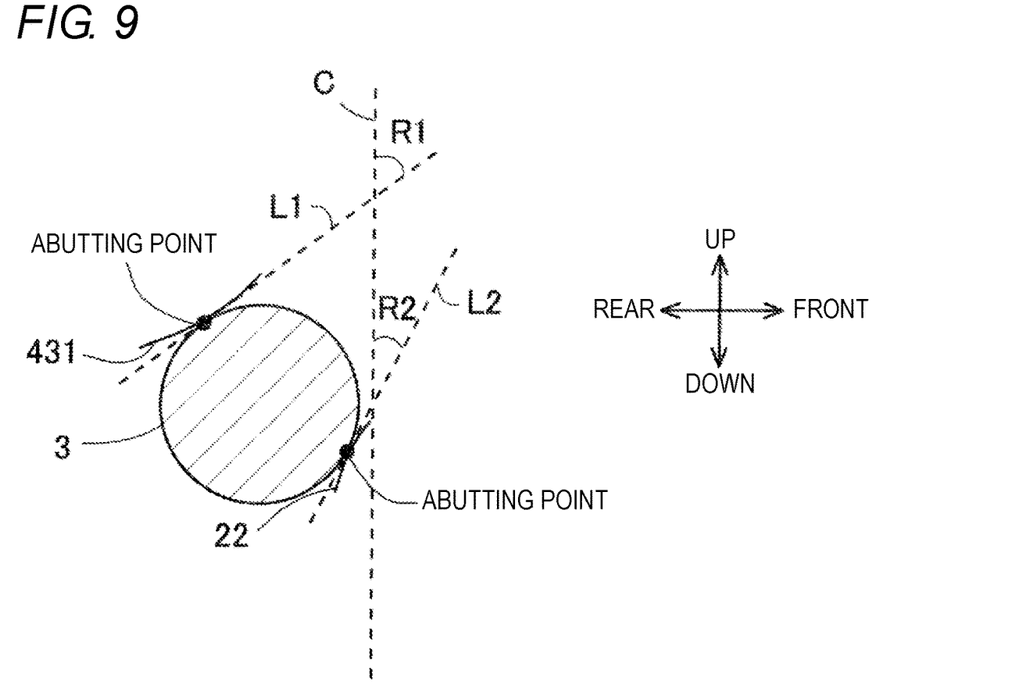
FIG. 9 is a diagram corresponding to FIG. 6 illustrating a modified example of the present embodiment.

Furthermore, as illustrated in FIG. 9, the guiding surface 431 is not limited to a linear shape in the left-right cross-section, and may be formed in an arc shape. Similarly, the valve seat surface 22 may also be formed in an arc shape in the left-right cross-section. That is, the valve seat surface 22 does not need to be tapered shape in which the diameter becomes smaller toward the lower side. Even in this case, it is preferable that the above relationship R1≥R2 is established in the assumed movement range of the valve body 3 in the abutment left-right cross-section. The magnitude of the force exerted by the pressing member 4 on the valve body 3 can be adjusted by the magnitudes of R1 and R2. The magnitude of the force acting on the valve body 3 can also be adjusted by, for example, changing the sliding resistance of the guiding part 43 depending on the abutment location (abutment part). Furthermore, the force/differential pressure (prescribed value/predetermined pressure) required for the valve body 3 to start moving from the closed state can be adjusted by, for example, the spring constant or the compression distance of the urging member 5, the angles R1 and R2, or the like.

The guiding surface 431 may not be formed by two inclined surfaces arranged in a V shape. For example, the connecting portion of the two inclined surfaces may be arcuate. Furthermore, the two abutting points, which are points in contact with the guiding surface 431 and the valve body 3, do not have to be positioned in plane symmetry with respect to the virtual first plane Z1. In this case, for example, the shortest distances from the two abutting points to the valve body movement locus may be located at distance different from each other. Furthermore, the guiding surface 431 may not have two abutting points each of which contacts the valve body 3. For example, the guiding surface 431 may include one abutment portion that comes into contact along the curved surface of the valve body 3 in the closed state. That is, the guiding surface 431 may be formed in an arc shape instead of the V shape in the cross-section orthogonal to the straight line extending in the front-rear direction.

The angle R1 may change according to the position of the pressing member 4. The amount by which the angle R1 changes may be adjusted depending on, for example, the position where the pressing member 4 and the retainer 6 come into contact with each other and the characteristics of the urging member 5. Furthermore, the valve body 3 need not be a spherical body. Even in these cases, the valve 1 may be configured such that a force acts on the valve body 3 along the valve seat surface 22 in the direction of closing the valve hole 21.

The invention claimed is:

1. A valve comprising:
   a valve seat formed with a valve hole;
   a valve body; and
   a pressing member that presses the valve body toward the valve hole, the valve hole being closed by the valve body pressed by the pressing member; wherein
   the pressing member includes a guiding part that separates the valve body away from the valve seat while relatively moving the valve body in a predetermined one direction by restricting the movement direction of the valve body in one direction when a force opposing a pressing force of the pressing member acts on the valve body by greater than or equal to a prescribed value, and the guiding part includes a guiding surface that guides the valve body to move relative to the guiding part in the radial direction of the pressing member for the relative moving of the valve body in the predetermined one direction.

2. The valve according to claim 1, wherein the guiding surface is configured to abut with the valve body at least two points, and so that a locus of the valve body relating to the relative movement passes through the central axis of the valve hole.

3. The valve according to claim 2, wherein two abutting points included in the at least two points that abut with the valve body on the guiding surface are located in plane symmetry with respect to a plane including the locus.

4. The valve according to claim 3, wherein the valve seat has a tapered valve seat surface that is linearly inclined with respect to an axial direction that is a direction in which the valve hole extends, and the guiding surface abuts with the valve body and is linearly inclined with respect to the axial direction.

5. The valve according to claim 3, wherein the valve seat has a valve seat surface with which the valve body abuts, and the guiding part and the valve seat surface are configured to apply a force to the valve body to move the valve body in a direction of closing the valve hole along the valve seat surface.

6. The valve according to claim 2, wherein the valve seat has a valve seat surface with which the valve body abuts, and the guiding part and the valve seat surface are configured to apply a force to the valve body to move the valve body in a direction of closing the valve hole along the valve seat surface.

7. The valve according to claim 2, wherein the valve seat has a tapered valve seat surface that is linearly inclined with respect to an axial direction that is a direction in which the valve hole extends, and the guiding surface abuts with the valve body and is linearly inclined with respect to the axial direction.

8. The valve according to claim 1, wherein the valve seat has a valve seat surface with which the valve body abuts, and the guiding part and the valve seat surface are configured to apply a force to the valve body to move the valve body in a direction of closing the valve hole along the valve seat surface.

9. The valve according to claim 8, wherein the valve seat has a tapered valve seat surface that is linearly inclined with respect to an axial direction that is a direction in which the valve hole extends, and the guiding surface abuts with the valve body and is linearly inclined with respect to the axial direction.

10. The valve according to claim 1, wherein the valve seat has a tapered valve seat surface that is linearly inclined with respect to an axial direction that is a direction in which the valve hole extends, and the guiding surface abuts with the valve body and is linearly inclined with respect to the axial direction.

* * * * *